United States Patent
Burdgick et al.

(10) Patent No.: US 7,147,437 B2
(45) Date of Patent: Dec. 12, 2006

(54) MIXED TUNED HYBRID BLADE RELATED METHOD

(75) Inventors: Steven Sebastian Burdgick, Schenectady, NY (US); Guy W. DeLeonardo, Glenville, NY (US); Wendy W. Lin, Niskayuna, NY (US); Kevin Joseph Barb, Halfmoon, NY (US)

(73) Assignee: General Electric Company, Schenectady, NY (US)

( * ) Notice: Subject to any disclaimer, the term of this patent is extended or adjusted under 35 U.S.C. 154(b) by 148 days.

(21) Appl. No.: 10/913,407

(22) Filed: Aug. 9, 2004

(65) Prior Publication Data

US 2006/0029501 A1 Feb. 9, 2006

(51) Int. Cl.
*F01D 5/26* (2006.01)
(52) U.S. Cl. .................. 416/1; 416/224; 416/229 A; 416/230; 416/236 R; 416/241 A; 416/500
(58) Field of Classification Search .............. 416/1, 416/500, 203, 224, 229 R, 229 A, 230, 236, 416/241 A
See application file for complete search history.

(56) References Cited

U.S. PATENT DOCUMENTS

| | | | |
|---|---|---|---|
| 4,097,192 A | 6/1978 | Kulina | |
| 5,286,168 A | 2/1994 | Smith | |
| 5,295,789 A * | 3/1994 | Daguet | 416/241 A |
| 5,524,341 A | 6/1996 | Ferleger et al. | |
| 5,720,597 A | 2/1998 | Wang et al. | |
| 5,931,641 A | 8/1999 | Finn et al. | |
| 5,947,688 A | 9/1999 | Schilling et al. | |
| 6,033,186 A | 3/2000 | Schilling et al. | |
| 6,039,542 A | 3/2000 | Schilling et al. | |
| 6,042,338 A | 3/2000 | Brafford et al. | |
| 6,139,278 A | 10/2000 | Mowbray et al. | |
| 6,224,341 B1 * | 5/2001 | Fricke | 416/248 |
| 6,287,080 B1 | 9/2001 | Evans et al. | |
| 6,428,278 B1 | 8/2002 | Montgomery et al. | |
| 6,471,482 B1 | 10/2002 | Montgomery et al. | |
| 6,854,959 B1 * | 2/2005 | Barb | 416/1 |

* cited by examiner

FOREIGN PATENT DOCUMENTS

EP    1 152 123 A2    11/2001

OTHER PUBLICATIONS

European Search Report for Application No. 05254608, dated Sep. 30, 2005.

*Primary Examiner*—Ninh H. Nguyen
(74) *Attorney, Agent, or Firm*—Nixon & Vanderhye P.C.

(57) ABSTRACT

A steam turbine blade includes a shank portion and an airfoil portion. The airfoil portion is formed with at least one pocket filled with a polymer filler material chosen as a function of natural frequency impact on the turbine blade or as a function of the damping characteristics of the filler materials. A steam turbine rotor wheel includes a plurality of blades secured about a circumferential periphery of the wheel, each blade having one or more pockets in the airfoil portion, the plurality of blades divided into two groups of blades. The pockets of one group of blades are filled with one or more polymer filler materials, and the pockets of the other group of blades filled with one or more polymer filler materials, wherein the polymer filler materials in the one group of blades creates different natural frequencies or damping characteristics in the blades of the one group than the polymer filler materials in the blades of the other group. The two groups of blades are assembled on the rotor wheel in accordance with a predetermined pattern.

23 Claims, 4 Drawing Sheets

MIXED TUNED HYBRID BLADE RELATED METHOD

BACKGROUND OF THE INVENTION

This invention relates generally to steam turbine buckets (or blades) and, more particularly, to hybrid composite blades specifically designed to provide different predetermined material frequency and/or damping characteristics for improved system performance.

Steam turbine blades operate in an environment where they are subject to high centrifugal loads and vibratory stresses. Vibratory stresses increase when blade natural frequencies become in resonance with running speed or other passing frequencies (upstream bucket or nozzle count, or other major per/rev features). The magnitude of vibratory stresses when a blade vibrates in resonance is proportional to the amount of damping present in the system (damping is comprised of material, aerodynamic and mechanical components, as well as the vibration stimulus level). For continuously coupled blades, the frequency of vibration is a function of the entire system of blades in a row, and not necessarily that of individual blades within the row.

At the same time, centrifugal loads are a function of the operating speed, the mass of the blade, and the radius from engine centerline where that mass is located. As the mass of the blade increases, the physical area or cross-sectional area must increase at lower radial heights to be able to carry the mass above it without exceeding the allowable stresses for the given material. This increasing section area of the blade at lower spans contributes to excessive flow blockage at the root and thus lower performance. The weight of the blade contributes to higher rotor dovetail and disk stresses and thus to potentially reduced reliability.

Several prior U.S. patents relate to so-called "hybrid" blade designs where the weight of the airfoil is reduced by composing the airfoil as a combination of a metal and polymer filler material. Specifically, one or more pockets are formed in the airfoil portion and filled with the polymer filler material in such a way that the airfoil profile is not altered. These prior patents include U.S. Pat. Nos. 6,139,278; 6,042,338; 5,931,641 and 5,720,597. Co-pending and commonly owned application Ser. No. 10/249,518 filed Apr. 16, 2003 discloses hybrid blades where pocket configurations are altered to vary the damping characteristics of respective groups of blades.

There is thus a need to continue the development of hybrid blades to improve the collective natural frequency and/or damping characteristics of rows of turbine blades.

BRIEF DESCRIPTION OF THE INVENTION

This invention relates to the expansion of hybrid blade technology for the purpose of reducing or more effectively damping vibrations in steam turbine blades.

In a first exemplary embodiment, the blades are manufactured with one or more pockets that are filled with polymer filler materials. The filler materials are chosen to alter the natural frequency of the blades within a row of blades. Thus, an undesirable natural frequency may be "tuned out" through the selection of appropriate filler material for the various blades in a row of such blades. Two or more filler materials could be used in as many blade pockets to achieve the desired frequency modification. This arrangement may or may not change the damping characteristics of the entire row of blades.

In a variation of this embodiment, two groups of hybrid blades are provided for mounting in a single row of blades. One group of hybrid blades utilizes polymer filler materials of higher stiffness than used in the other group of blades. By assembling the blades on the wheel in a predetermined symmetrical pattern, not only will the natural frequencies vary, but the damping characteristics of the entire row of blades may change as well. In any event, by varying the natural frequencies of the blades within a row of blades, the aero-elastic response of the entire row is suppressed, without adversely affecting the aerodynamic properties of the blade.

In a second embodiment, the polymer filler materials are chosen as a function of the damping characteristics of the filler material. In other words, filler materials are specified as a function of their damping characteristics so that blade vibrations can be suppressed to a tolerable level. In one example, all of the blades in a row of blades will utilize at least two filler materials in the blade pockets in order to change the damping characteristics of the row. In another example, two or more groups of blades are assembled in a row. Each group of blades will utilize filler materials with damping characteristics different from the filler materials used in the other group or groups. The focus in this embodiment is to rely on the "mixed tuning" concept to arrange the groups of buckets so as to achieve a more damped row of buckets. It is also possible, however, that this technique will also shift the frequencies of each bucket so as to further improve the overall damping of the system response to synchronous and non-synchronous vibrations.

Accordingly, in its broader aspects, the invention relates to a steam turbine blade comprising a shank portion and an airfoil portion, the airfoil portion formed with at least one pocket, the pocket filled with a polymer filler material chosen as a function of natural frequency impact on the turbine blade.

In another aspect, the invention relates to a steam turbine rotor wheel comprising a plurality of blades secured about a circumferential periphery of the wheel, each blade comprising a shank portion, an airfoil portion and one or more recessed pockets in the airfoil portion, the plurality of blades divided into two groups of blades, the pockets of one group of blades filled with one or more polymer filler materials, and the pockets of the other group of blades filled with one or more polymer filler materials, wherein the polymer filler materials in the one group of blades creates different natural frequencies in the blades of the one group than the polymer filler materials in the blades of the other group, and wherein the two groups of blades are assembled on the rotor wheel in accordance with a predetermined pattern.

In another aspect, the invention relates to a steam turbine blade comprising a shank portion and an airfoil portion, the airfoil portion formed with plural pockets filled with polymer filler materials chosen as a function of damping characteristics of the polymer filler materials.

In another aspect, the invention relates to a steam turbine rotor wheel comprising a plurality of blades secured about a circumferential periphery of the wheel, each blade comprising a shank portion, an airfoil portion and one or more pockets in the airfoil portion, the plurality of blades divided into two groups of blades, the one or more pockets of one group of blades filled with first polymer filler materials, and the pockets of the other group of blades filled with second polymer filler materials, wherein the first and second polymer fillers create different damping characteristics in the blades of the one group than the polymer filler materials in the other group, and wherein the two groups of blades are assembled on the rotor wheel in accordance with a predetermined pattern.

In still another aspect, the invention relates to a method of suppressing the aero-elastic response of a row of blades on a steam turbine wheel comprising (a) providing a plurality of blades, each having one or more pockets formed therein; and (b) filling the one or more pockets with one or more filler materials chosen as a function of natural frequency impact on the row of blades.

In still another aspect, the invention relates to a method of suppressing the aero-elastic response of a row of blades on a steam turbine wheel comprising (a) providing a plurality of blades, each having one or more pockets formed therein; and (b) filling the one or more pockets with one or more filler materials chosen as a function of damping characteristics of the one or more filler materials.

The invention will now be described in detail in connection with the drawings identified below.

DETAILED DESCRIPTION OF THE INVENTION

Figure 1:
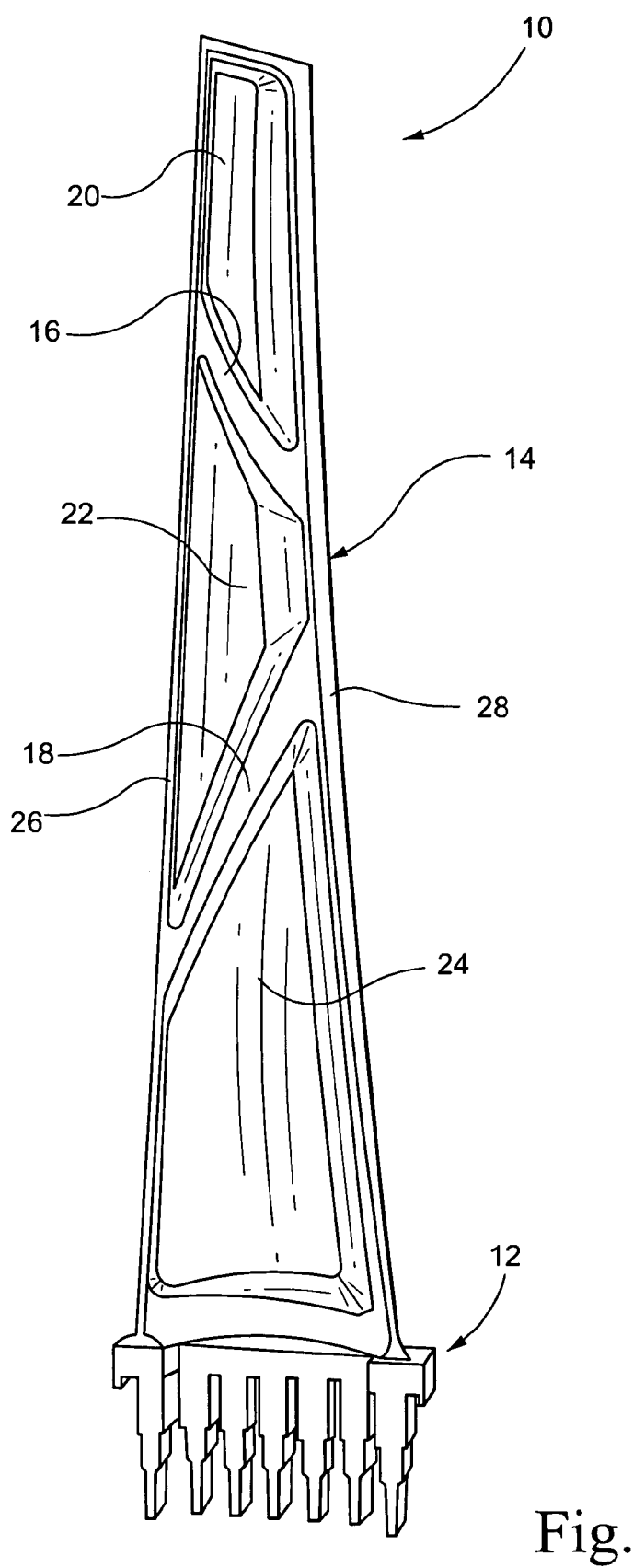
FIG. 1 is a perspective view of a partially manufactured blade with a filler pockets formed therein.
Figure 2:
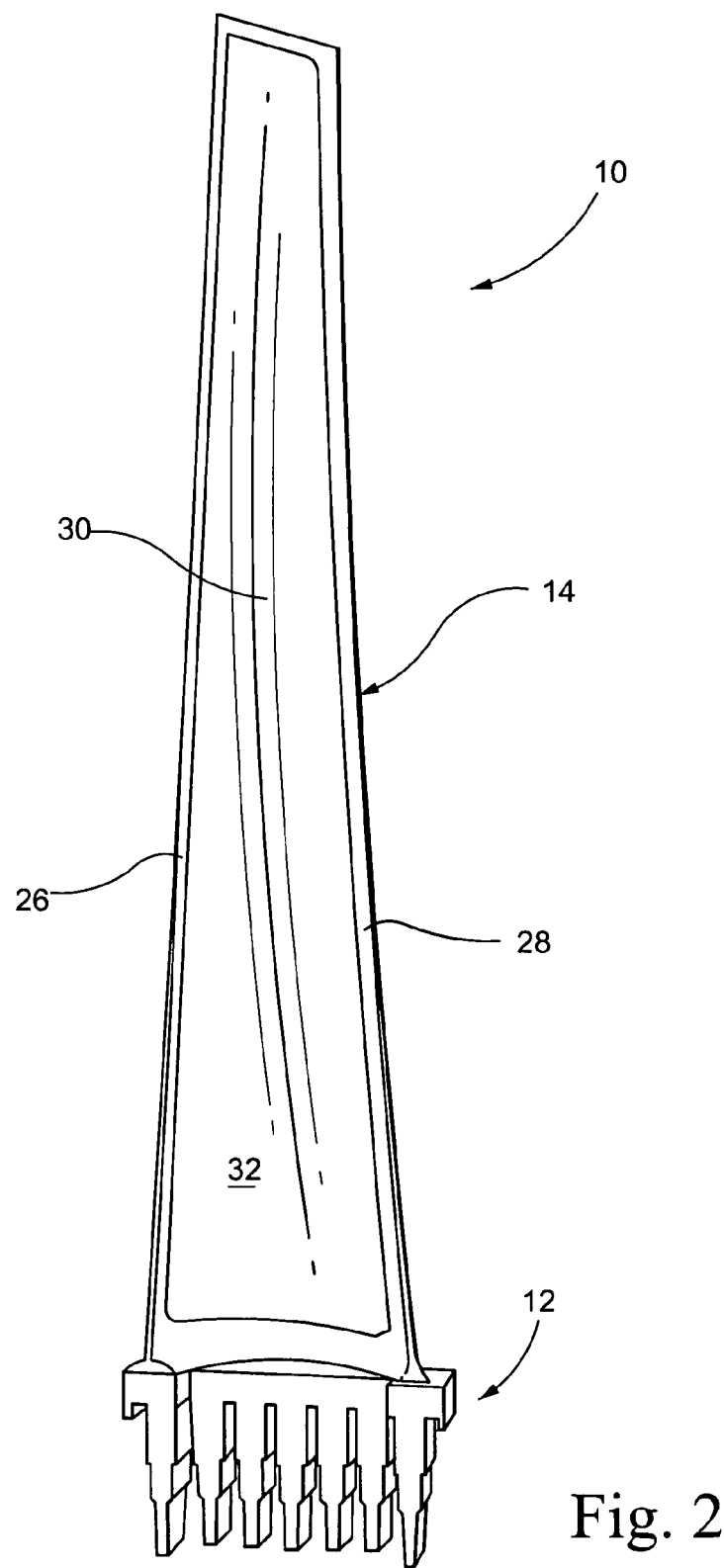
FIG. 2 is a perspective view of the blade shown in FIG. 1 but after the polymer filler material is added to the blade.

With reference to FIG. 1, a steam turbine blade 10 is shown in partially manufactured form. The blade 10 includes a shank portion 12 and an airfoil portion 14. This invention is especially concerned with the airfoil portion 14 that is preferably constructed of steel or titanium but other suitable materials include aluminum, cobalt or nickel. Ribs 16, 18 are integrally cast with the airfoil portion to form discrete filler pockets (or simply, pockets) 20, 22 and 24. It will be appreciated, however, that the ribs do not extend flush with the side edges 26, 28 of the airfoil portion. In one example, a polymer (urethane)-based filler material 30 is cast-in-place over the pressure (or suction) side of the airfoil, filling the pockets 20, 22 and 24 and covering the ribs to thereby form a smooth polymer face 32 over the entire pressure side of the blade, as shown in FIG. 2. It is also within the scope of the invention to have the ribs or surfaces defining the individual pockets to be flush with the remaining exterior surface of the airfoil such that the individual pockets or recesses are filled individually with smooth interfaces between the polymer filler and metal surfaces.

In the above described embodiment, the ribs 16, 18 are shown as angled in opposite directions along the length of the airfoil portion 14, but other arrangements producing differently-shaped pockets in desired locations along the pressure (or suction) side of the airfoil portion are within the scope of this invention as well.

Figure 3:
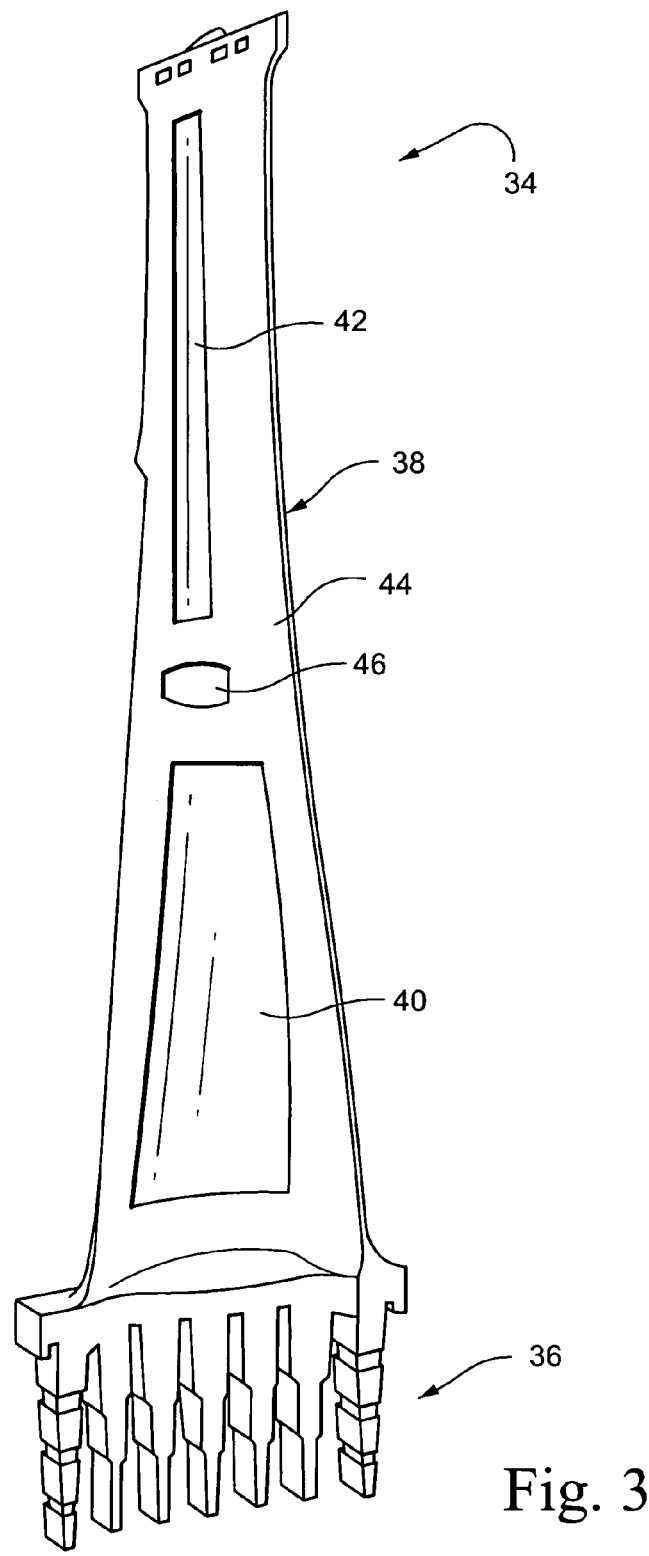
FIG. 3 is a perspective view of a partially manufactured blade in accordance with another example.
Figure 4:
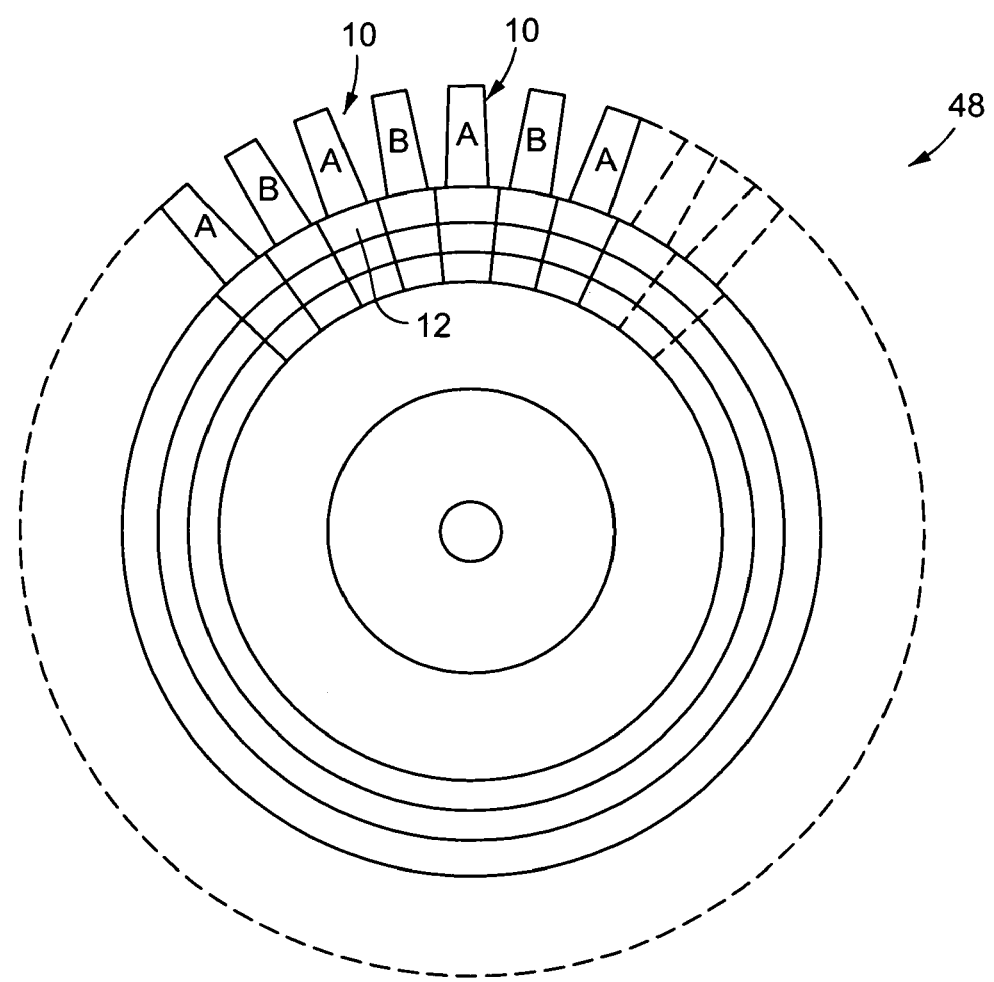
FIG. 4 is a schematic side elevation of a turbine wheel having a plurality of turbine blades mounted thereon.

For example, FIG. 3 shows a blade 34 including a shank portion 36 and an airfoil portion 38. Radially inner and outer pockets 40, 42 are formed on the pressure side of the airfoil portion 38, separated by a relatively wide web or rib 44 and a mid-span damper.

The filler material 30 for pockets 20, 22, 24, 40 and 42 may comprise urethane-based polymers of different durometer, silicone-based polymers, rubber-based compounds or polymer mixtures with suitable stiffeners and/or other materials such as glass or ceramics to adjust frequency, damping, erosion-resistance, etc. Some suitable filler composition are disclosed, for example, in U.S. Pat. Nos. 6,287,080 and 5,931,641. Choices for bonding the filler material 30 to the metal surface of the airfoil portion include, without limitation, self adhesion, adhesion between the filler material 30 and the metal surface of the airfoil portion, adhesive bonding (adhesive film or paste), and fusion bonding.

In a first exemplary embodiment, the pockets 20, 22 and 24 of blade 10 or pockets 40, 42 of blade 34 within a row of such blades are filled with filler materials chosen as a function of natural frequency. In one example, all of the pockets (from one to four or more) would be filled with a similar polymer filler material designed to achieve the desired natural frequencies of the individual blades as well as the entire row of blades. In another example, each blade would incorporate at least two different filler materials of, for example, different stiffness, to achieve the desired natural frequencies.

In a second embodiment, two or more groups of blades 10 (or 34) with recessed pockets like those at 20, 22 and 24 in FIG. 1 (or 40, 42 in FIG. 3) along the pressure side of the airfoil may be formed with different filler materials in the pockets of the blades of each group. By way of example, one group of blades may use a higher strength or "stiffer" material as the pocket filler, while the other group of blades may use a lower stiffness material. Alternatively, plural pockets in the blades of one group may be filled with plural polymer fillers, respectively, and the plural pockets of the other group may be filled with respectively different plural polymer fillers. Thus, for example, and with reference to blade 34 in FIG. 3, pocket 40 may be filled with polymer "a" and pocket 42 filled with polymer "b" for a first group of blades. For a second group of blades 34, pocket 40 may be filled with polymer "c" and pocket 42 filled with polymer "d." Again, these materials are chosen so as to achieve different resonance frequencies in the two groups of blades.

The blade designs described above may be utilized to form a row of blades on a steam turbine rotor wheel 48 as illustrated in FIG. 5. Specifically, groups A and B (comprised of, e.g., blades 10 or 34), may be assembled on the turbine wheel in a predetermined mapped configuration for example, in the pattern ABAB . . . , such that a blade of group A is always adjacent a blade of group B. In this way, the two (or more) populations of blades maybe purposefully manufactured and logically assembled so as to utilize their inherent differences in resonance frequencies as a means of reducing the system response to synchronous and non-synchronous vibrations, without adversely affecting the aerodynamic properties of the blade design. Further in this regard, there exists the potential to design one group of blades where the natural frequency is equally disposed between two "per-rev" criteria (4 per rev and 5 per rev split for example), and to design the other group of blades with a different filler material, so as to be equally disposed about another set of "per-rev" stimuli (such as a 3 per rev and 4 per rev split).

It is also possible to vary the pattern of blade group distribution, again so as to achieve the desired frequency characteristics. For example, a pattern AABBAA . . . or AABAAB . . . might also be employed.

In the second embodiment of the invention, the blades are manufactured with one or more pockets filled with urethane or silicon polymer filler materials chosen as a function of damping characteristics of the filler materials.

This may be accomplished in one of two methods. The first method would be to use one or more multiple fillers within the pockets 20, 22, 24 of each blade 10 (or pockets 40, 42 of blade 34), chosen to alter the damping coefficients of each of the blades as well as the damping response of the entire row of blades. Depending upon where the specific material properties are required, some pockets could be filled with either a highly damped material or a material that may meet some other specific requirement, not necessarily related to damping. In some areas of the blade, for example, erosion may be a concern; materials that are desirable for erosion prevention, however, may not be desirable for vibration reduction. In other areas, erosion may not be as much of an issue, and vibration damping may be the principal concern. In any event, by altering the damping characteristics to a greater or lesser extent, the magnitude of the system vibrations in the row of blades may be reduced to a tolerable level.

The second method associated with this second embodiment again involves the separation of blades 10 into two discrete groups, each of which incorporates different filler materials 30 to adjust the damping coefficient of the blades within the respective groups. For example, all of the blades of one group would incorporate one or more fillers in the respective pockets, while all of the blades of the second group would incorporate a different choice of one or more fillers. The blades would be assembled in a mapped configuration like those described above, i.e., ABAB . . . or AABBAA . . . , etc. The mapped configuration results in mixed tuning of the set of blades via various damping responses of the blades in each group of blades to create a more damped blade row or set. This may also shift the frequencies of each blade to take even greater advantage of the mixed tuning concept.

Each of the above methods may lead to the removal of the typical mechanical damper 46 (FIG. 3) at the mid-span of certain blade designs. This mid-span connection is a flow disturbance that leads to reduced turbine efficiency. In other words, by using appropriate filler materials with improved damping properties, the complete removal of the current mid-span damper is possible.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A steam turbine blade comprising a shank portion and an airfoil portion, the airfoil portion formed with at least two pockets, each pocket filled with a different polymer filler material chosen as a function of natural frequency impact on the turbine blade.

2. The steam turbine blade of claim 1 wherein said polymer filler materials comprise urethane-based polymers.

3. The steam blade of claim 1 wherein said first and second polymer filler materials comprise urethane-based polymers of different durometer.

4. The steam blade of claim 1 wherein said polymer filler material contains one or more stiffeners.

5. A steam turbine rotor wheel comprising a plurality of blades secured about a circumferential periphery of the wheel, each blade comprising a shank portion, an airfoil portion and one or more recessed pockets in the airfoil portion, said plurality of blades divided into two groups of blades, the pockets of one group of blades filled with one or more polymer filler materials, and the pockets of the other group of blades filled with one or more polymer filler materials, wherein the polymer filler materials in the one group of blades are chosen to create different natural frequencies in the blades of the one group than the polymer filler materials in the blades of the other group, and wherein the two groups of blades are assembled on the rotor wheel in accordance with a predetermined pattern.

6. The steam turbine rotor wheel of claim 5 wherein the blades of one group alternate about the periphery of the wheel with blades of the other group, such that any blade of one group is always adjacent a blade of the other group.

7. The steam turbine rotor wheel of claim 5 wherein said first and second polymer filler materials comprise urethane-based polymers of different durometer.

8. The steam turbine rotor wheel of claim 6 wherein all of the pockets of the blades in said one group are filled with a first polymer filler and all of the pockets of the blades in a second group are filled with a second polymer filler material.

9. The steam turbine rotor wheel of claim 5 wherein at least two pockets are formed in each blade of said one and said other groups of blades and wherein different filler materials are used in said at least two pockets, respectively, of said one an said other groups of blades.

10. The steam turbine rotor wheel of claim 5 wherein said different polymer filler materials contain one or more stiffeners.

11. A steam turbine blade comprising a shank portion and an airfoil portion, the airfoil portion formed with plural pockets filled with polymer filler materials chosen as a function of damping characteristics of said polymer filler materials; and
wherein different filler materials are used in said plural pockets of each blade.

12. The steam turbine blade of claim 11 wherein said filler materials comprise urethane-based polymers.

13. The steam turbine blade of claim 11 wherein said filler materials comprise silicone-based polymers.

14. The steam turbine blade of claim 11 wherein said polymer filler materials include one or more stiffeners.

15. A steam turbine rotor wheel comprising a plurality of blades secured about a circumferential periphery of the wheel, each blade comprising a shank portion, an airfoil portion and one or more pockets in the airfoil portion, said plurality of blades divided into two groups of blades, the one or more pockets of one group of blades filled with first polymer filler materials, and the pockets of the other group of blades filled with second polymer filler materials, wherein the first and second polymer fillers create different damping characteristics in the blades of the one group than the polymer filler materials in the other group, and wherein the two groups of blades are assembled on the rotor wheel in accordance with a predetermined pattern.

16. The steam turbine rotor wheel of claim 15 wherein the blades of one group alternate about the periphery of the wheel with blades of the other group, such that any blade of one group is always adjacent a blade of the other group.

17. The steam turbine rotor wheel of claim 15 wherein said filler materials comprise urethane-based polymers.

18. The steam turbine rotor wheel of claim 15 wherein said filler materials comprise silicone-based polymers.

19. The steam turbine rotor wheel of claim 15 wherein all of the pockets of the blades in said one group are filled with a first polymer filler and all of the pockets of the blades in a second group are filled with a second polymer filler material.

20. The steam turbine rotor wheel of claim 15 wherein at least two pockets are formed in each blade of said one and said other groups of blades and wherein different filler materials are used in said at least two pockets, respectively, of said one an said other groups of blades.

21. The steam turbine rotor wheel of claim 15 wherein said first and second polymer filler materials contain one or more stiffeners.

22. A method of suppressing the aero-elastic response of a row of blades on a steam turbine wheel comprising:
 (a) providing a plurality of blades, each having one or more pockets formed therein; and
 (b) filling said one or more pockets with one or more filler materials compositions chosen as a function of natural frequency impact on the row of blades.

23. A method of suppressing the aero-elastic response of a row of blades on a steam turbine wheel comprising:
 (a) providing a plurality of blades, each having one or more pockets formed therein; and
 (b) filling said one or more pockets with one or more filler materials compositions chosen as a function of damping characteristics of the one or more filler materials.

* * * * *